Nov. 2, 1954  F. J. RODIN  2,693,068
POTATO DIGGING AND SEPARATING MACHINE
Filed March 25, 1952  5 Sheets-Sheet 1
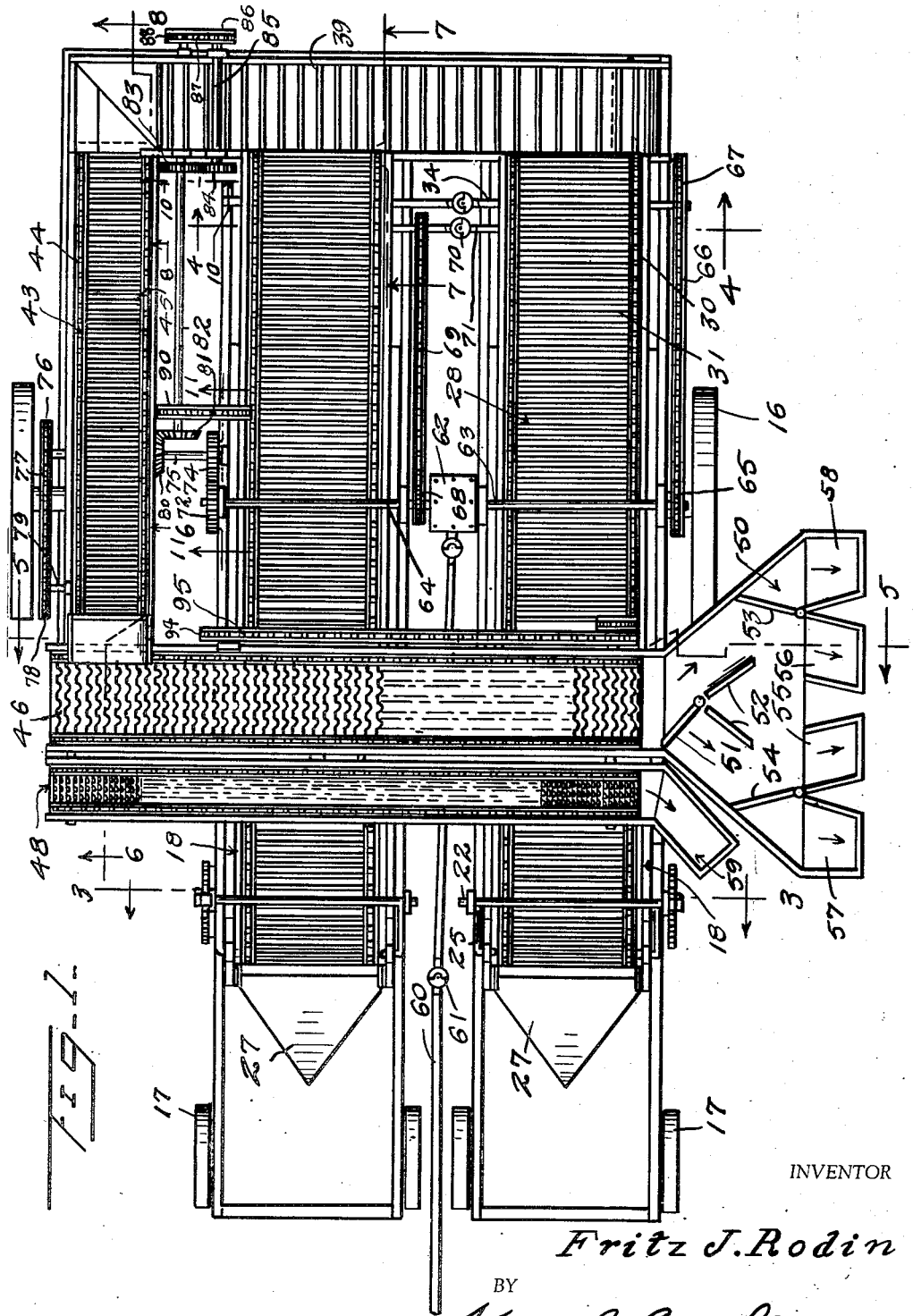
INVENTOR
Fritz J. Rodin
BY
Kimmel & Crowell ATTORNEYS

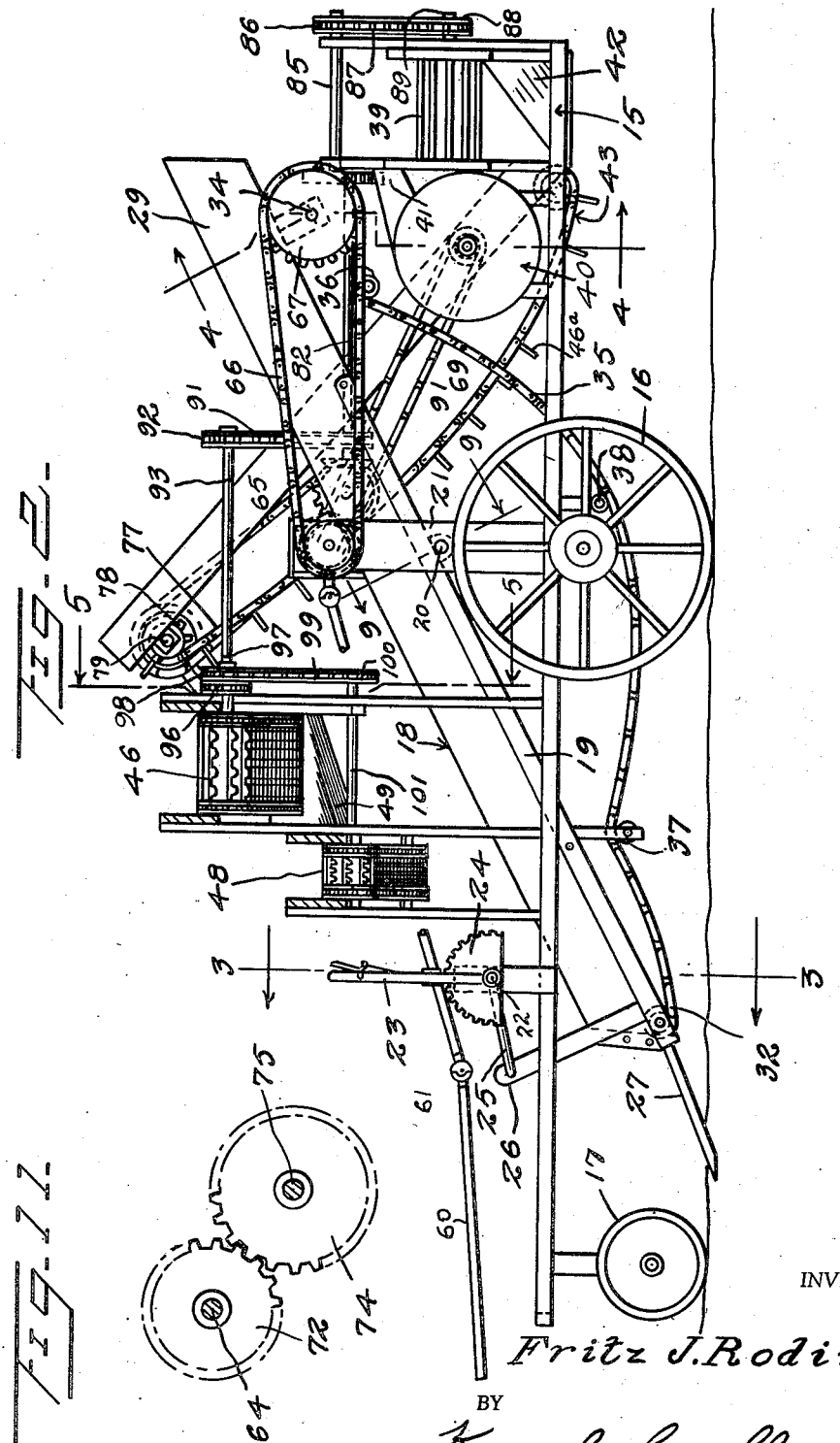

Nov. 2, 1954  F. J. RODIN  2,693,068
POTATO DIGGING AND SEPARATING MACHINE
Filed March 25, 1952  5 Sheets-Sheet 3
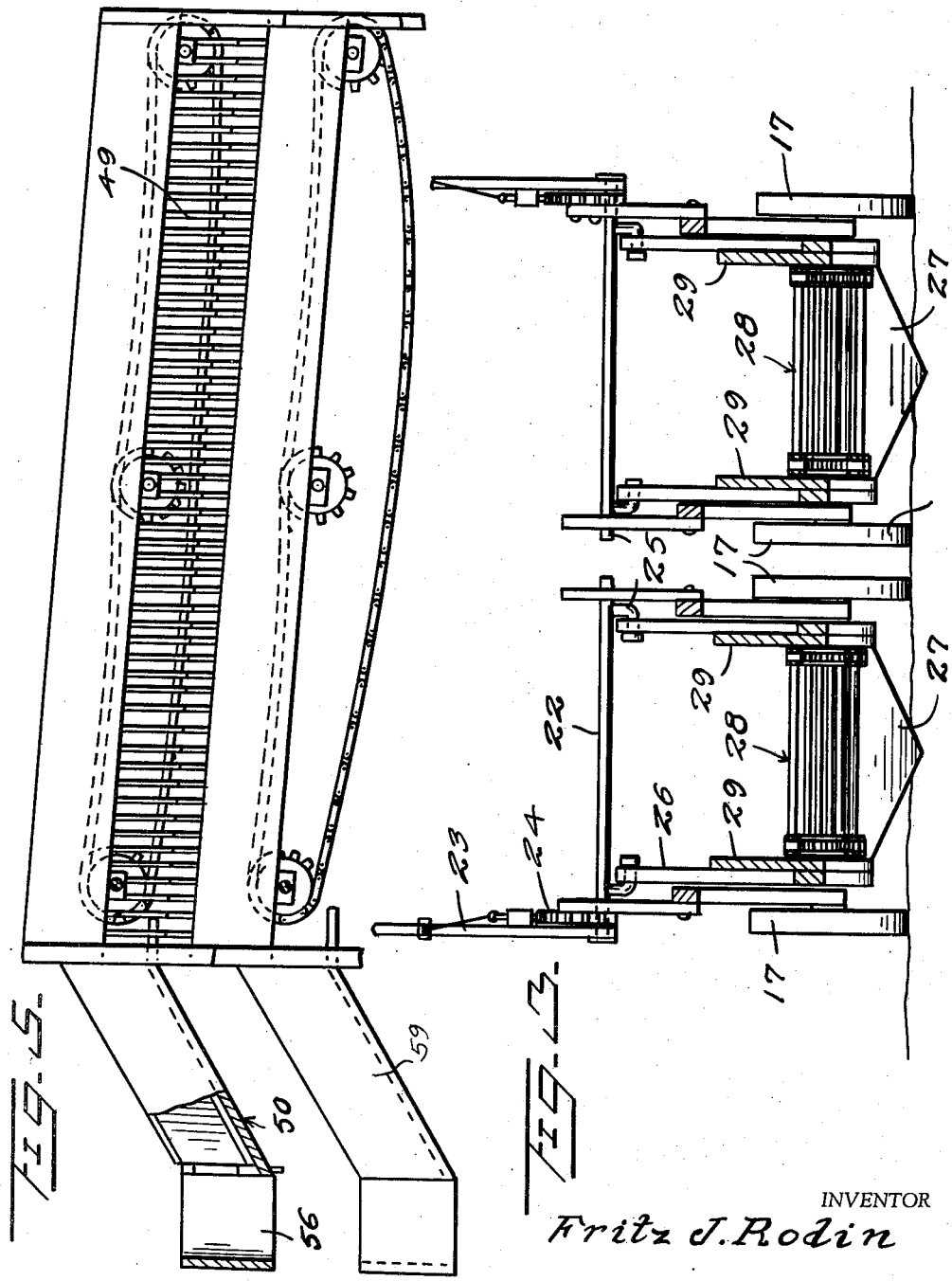
INVENTOR
*Fritz J. Rodin*
BY *Kimmel & Crowell*
ATTORNEYS

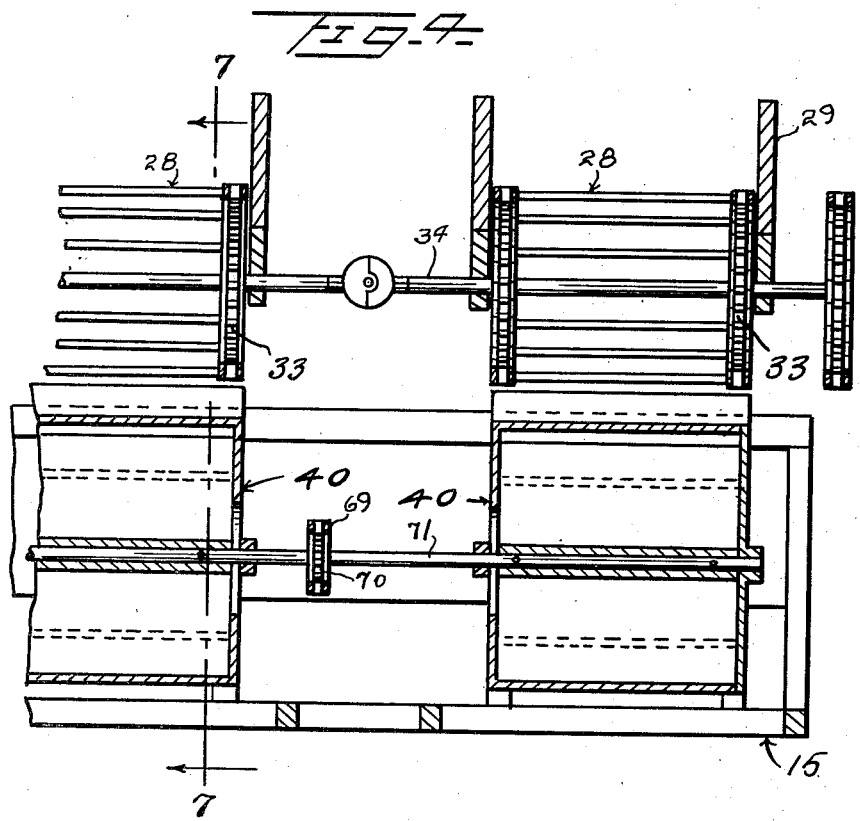
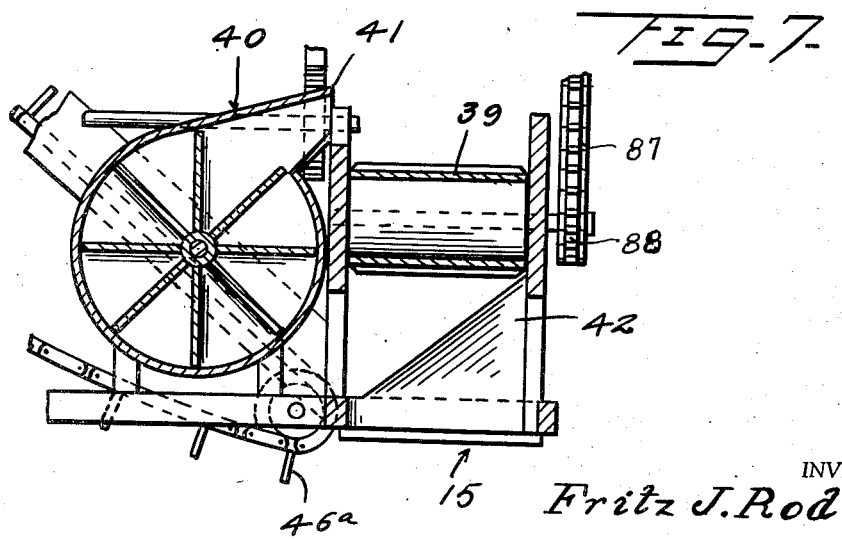

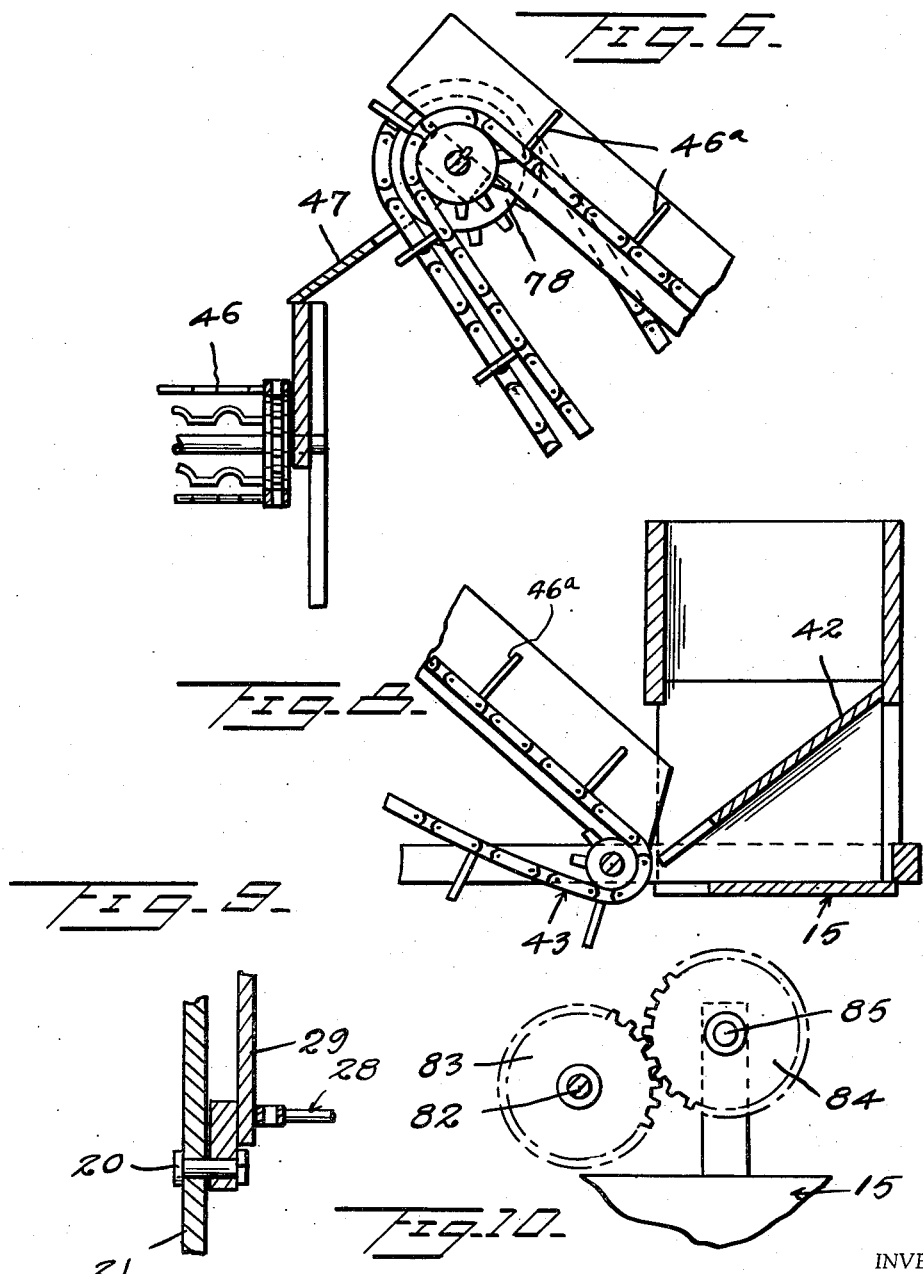

United States Patent Office 2,693,068
Patented Nov. 2, 1954

2,693,068

POTATO DIGGING AND SEPARATING MACHINE

Fritz J. Rodin, Chatham Center, N. Y.

Application March 25, 1952, Serial No. 278,338

1 Claim. (Cl. 55—51)

This invention relates to a potato digging and harvesting machine and is an improvement over the machine shown in my prior Patent No. 2,209,282 issued July 23, 1940, for Digging and Harvesting Machine.

An object of this invention is to provide a digging and harvesting machine for potatoes which will remove the potatoes from the ground, separate the potatoes from the vines and then grade the potatoes.

Another object of this invention is to provide a machine of this kind wherein the vines are separated from the potatoes without injury to the potatoes.

A further object of this invention is to provide in a potato digging and harvesting machine, means for sizing the potatoes as the latter are discharged from the last conveyors.

With the above and other objects in view, my invention consists in the arrangement, combination and details of construction disclosed in the drawings and specification, and then more particularly pointed out in the appended claim.

In the drawings:

Figure 1 is a plan view of a potato digging and harvesting machine constructed according to an embodiment of this invention.

Figure 2 is a detailed side elevation partly in section of the machine.

Figure 3 is an enlarged sectional view taken on the lines 3—3 of either Figure 1 or 2.

Figure 4 is an enlarged fragmentary sectional view taken on the lines 4—4 of either Figure 1 or 2.

Figure 5 is an enlarged fragmentary sectional view taken on the lines 5—5 of either Figure 1 or 2.

Figure 6 is an enlarged fragmentary sectional view taken on the line 6—6 of Figure 1.

Figure 7 is an enlarged fragmentary sectional view taken on the lines 7—7 of either Figure 1 or 4.

Figure 8 is an enlarged fragmentary sectional view taken on the line 8—8 of Figure 1.

Figure 9 is an enlarged fragmentary sectional view taken on the line 9—9 of Figure 2.

Figure 10 is an enlarged fragmentary sectional view taken on the line 10—10 of Figure 1.

Figure 11 is an enlarged fragmentary sectional view taken on the line 11—11 of Figure 1.

Referring to the drawings, the numeral 15 designates generally a mobile frame structure having a pair of rear traction wheels 16 mounted thereon and front traction wheels 17. The frame 15 has adjustably mounted thereon a pair of elevator structures generally designated as 18, and these elevators are of like construction and the detailed description of one elevator will apply equally as well to the other elevator.

Each elevator 18 is formed of a frame 19, which is rockably mounted, as at 20, on upright supports 21 carried by the frame 15. The elevator 18 is adapted to be vertically adjusted at its forward and by means of a shaft 22, which has an adjusting hand lever 23 fixed to one end thereof, and the lever 23 is movable relative to an arcuate rack 24 fixed to the frame 15.

The shaft 22 has fixed adjacent each end thereof a pair of L-shaped levers 25 which rockably engage upwardly projecting bars 26 fixed to the forward end of the elevator frame 19. The frame 19 has fixed to the forward end thereof a downwardly and forwardly projecting triangular shaped digging blade 27, which is adapted to dig the potatoes from the ground, and the potatoes are adapted to move upwardly over the blade 27.

A perforate endless elevator member 28 has an upper run movable between upstanding side boards 29 carried by the frame 19, and the elevator member 28 is formed of a pair of side chains 30 which are connected together by a plurality of parallel and spaced bars 31. The chains 30 at their forward ends engage over forward or lower sprockets 32 and at their upper or rear ends, engage over upper sprockets 33.

The sprockets 33 are mounted on a shaft 34 which is journalled below the upper rear end of the frame 19. The lower run 35 of the elevator member 28 is relatively slack and at its upper rear portion, engages over an idler roller 36; and at its forward end portion, engages over a forward idler roller 37. An intermediate idler roller 38 is carried by the frame 15 and is adapted to engage over the upper side of the elevator member 28, as shown in Figure 2.

A rear cross conveyor 39 is movably carried by the frame 15 a substantial distance below the rear end of conveyor 28 so that the potatoes, vines or the like will be discharged from elevator 28 to the cross conveyor 39. The forward edge of the cross conveyor 39 is substantially in the vertical plane of the rear upper end of the conveyor 29.

In order to provide a means whereby the vines will be separated from the potatoes as the vines and potatoes are gravitatingly discharged from elevator 28 to cross conveyor 39, I have provided a blower 40 which has the outlet nozzle 41 thereof disposed between the upper rear end of elevator 28 and the upper side of cross conveyor 39. The discharge nozzle 41 of blower 40 is adapted to direct an air stream across conveyor 39, and any loose vines which drop from elevator will be blown rearwardly and onto the ground at the rear of the machine, leaving the potatoes on the cross conveyor 39.

There is a blower 40 for each elevator 18 so that the vines or other loose material other than potatoes will be blown rearwardly and away from the cross conveyor 39.

The cross conveyor 39 is adapted to discharge the potatoes onto a downwardly and forwardly inclined chute 42, carried by the frame 15, and the chute 42 is preferably removable so that under certain circumstances, the potatoes may be discharged onto the ground by the cross conveyor 39. The chute or guide 42 is adapted to guide the loose potatoes downwardly and forwardly for engagement with a longitudinal elevator 43 which is formed of a pair of side chains 44 connected together by means of spaced parallel bars 45, and at spaced intervals upstanding cleats 46a are provided so as to hold the potatoes against downward and rearward movement as the upper run of the elevator 43 moves upwardly and forwardly.

The elevator 43 is adapted to discharge the potatoes, which at this time are substantially free of vines and dirt, onto a sizing conveyor 46. A plate 47 forming a guide is disposed below the upper forward end of elevator 43 and is adapted to guide the potatoes discharged from elevator 43 onto the transversely movable sizing conveyor 46.

A second sizing conveyor 48 is disposed below and forwardly of the conveyor 46, and the smaller potatoes passing through the sizing conveyor 46 are adapted to be guided to conveyor 48 by means of downwardly and forwardly inclined guide bars 49 disposed below conveyor 46. The larger potatoes which are conveyed transversely of the frame 15 by conveyor 46 are discharged from the latter to a substantially V-shaped receiver generally designated as 50.

The receiver 50 is provided with a main valve plate 51, which is swingable across the mouth of the receiver 50, as shown in Figure 1, so as to guide the potatoes to either the right or the left of the receiver 50. A pair of inwardly convergent baffles 52 are carried by the receiver 50, and a pair of adjustable valve plates 53 and 54 are carried by the forward or outer portion of receiver 50 and are adjustable toward or away from the baffles 52 so as to direct the potatoes to outer hoppers 55 and 56 or hoppers 57 and 58.

The potatoes, which are moved transversely of the frame 15 by the conveyor 48, are discharged into a receiver 59 projecting from the conveyor 48 and forwardly of the receiver 50. The several elevators and conveyors are operated from a shaft 60 having one or more universal joints 61 interposed therein, and shaft 60 is adapted to be connected to the power take-off of a tractor.

The rear end of shaft 60 is connected to a gear box or transmission 62, and lateral shafts 63 and 64 project from transmission 62. The outer end of shaft 63 has a sprocket 65 secured thereto about which a chain 66 engages, and chain 66 also engages at its rear portion about a rear sprocket 67 mounted on shaft 34.

The blowers 40 are operated by means of a sprocket 68 mounted on shaft 64, and a chain 69 is trained about sprocket 68 and about a sprocket 70 secured to a common shaft 71 connected between the two blowers 40. The outer end of shaft 64 has a spur gear 72 fixed thereto which engages a spur gear 74 secured to a short laterally projecting shaft 75.

Shaft 75 has fixed to the outer end thereof a sprocket 76 about which a chain 77 engages, and chain 77 also engages about an elevator sprocket 78 which is secured to an upper elevator shaft 79. The shaft 79 operates elevator 43. Shaft 75 has fixed thereto a beveled gear 80 which meshes with a beveled gear 81 fixed to a rearwardly projecting shaft 82.

The shaft 82 has fixed to the rear end thereof a spur gear 83 meshing with a second spur gear 84 which is fixed to a shaft 85. The shaft 85 extends rearwardly and over the cross conveyor 39, and the rear end of shaft 85 has fixed thereto a sprocket 86. A chain 87 engages about sprocket 86 and also about a conveyor driving sprocket 88, which is fixed to a shaft 89 adapted to operate the conveyor 39 at the forward end thereof. Shaft 82 has fixed thereon a sprocket 90 about which a chain 91 engages, and the chain 91 extends upwardly and engages about a sprocket 92 carried by an upper conveyor operating shaft 93.

The shaft 93 has fixed thereto a sprocket 94 about which a chain 95 engages, and the chain 95 extends laterally and engages about a sprocket 96 connected with the discharge end of conveyor 46. Sprocket 96 is secured to a shaft 97 and a second sprocket 98 is secured to shaft 97. A downwardly extending chain 99 engages about sprocket 98 and about a lower sprocket 100, which is fixed to a shaft 101. The shaft 101 is connected with the forward or discharge end of sizing conveyor 48.

In the use and operation of this device, the elevator 18 is lowered at its forward end by adjustment of hand lever 23 so that digging blade 27 will project into the ground a distance sufficient to engage below the potatoes. The potatoes with the dirt removed therewith and with the vines will move upwardly over blade 27, and the rearwardly moving upper run of elevator member 28 will pick up the potatoes and vines so as to move the same upwardly and rearwardly. The loose dirt will drop between the screening bars 31, and when the potatoes and vines are discharged from the upper rear end of elevator member 28, the vines and potatoes will drop downwardly through the rearwardly moving air stream generated by the blower 40. Loose vines will be blown over cross conveyor 39 onto the ground at the rear of the machine. The potatoes will drop onto rear cross conveyor 39 and will be discharged into chute 42, where the potatoes will be guided to the longitudinal elevator 43. The potatoes will be discharged from elevator 43 to the sizing conveyor 46, the larger potatoes remaining on conveyor 46 and the smaller potatoes dropping through this conveyor and being guided by the guide bars 49 to the conveyor 48. The potatoes which are moved transversely by conveyor 46 will be discharged into receiver 50, and it will be understood that this receiver may include a means for supporting bags so that the potatoes will be immediately bagged or sacked.

The provision of the blowers for removing the vines will provide a means whereby the vines may be separated from the potatoes without injury to the latter, and it will be understood that cross conveyor 39 may be a plain, flat belt or may be provided with ribs which may be formed of rubber or the like which will not injure the potatoes as the latter are discharged from the elevator 28 to the cross conveyor 39.

I do not mean to confine myself to the exact details of construction herein disclosed, but claim all variations falling within the purview of the appended claim.

What is claimed is:

In a potato digger, a mobile frame, a digging member carried by said frame, an elevator extending rearwardly and upwardly from said member, a cross conveyor carried by said frame, a substantial distance below the rear upper end of said elevator whereby the dropping material may freely separate, the forward edge of said cross conveyor being substantially in the vertical plane of the rear upper end of said elevator whereby the material will gravitatingly drop downwardly from said elevator to said cross conveyor, and a blower disposed below said elevator having the outlet thereof upwardly and outwardly inclined and disposed closely adjacent said cross conveyor whereby to blow loose and separated dirt and vines rearwardly over said cross conveyor.

References Cited in the file of this patent

UNITED STATES PATENTS

| Number | Name | Date |
|---|---|---|
| 1,715,218 | Wright et al. | May 28, 1929 |
| 2,209,282 | Rodin | July 23, 1940 |
| 2,373,426 | Spafford | Apr. 10, 1945 |